F. N. FONS.
COCOANUT HUSKER.
APPLICATION FILED OCT. 29, 1919.

1,367,809.

Patented Feb. 8, 1921.
3 SHEETS—SHEET 1.

WITNESSES
E. A. Hagen
P. H. Pattison

INVENTOR
Felipe N. Fons,
BY
ATTORNEYS

F. N. FONS.
COCOANUT HUSKER.
APPLICATION FILED OCT. 29, 1919.
1,367,809.
Patented Feb. 8, 1921.
3 SHEETS—SHEET 2.
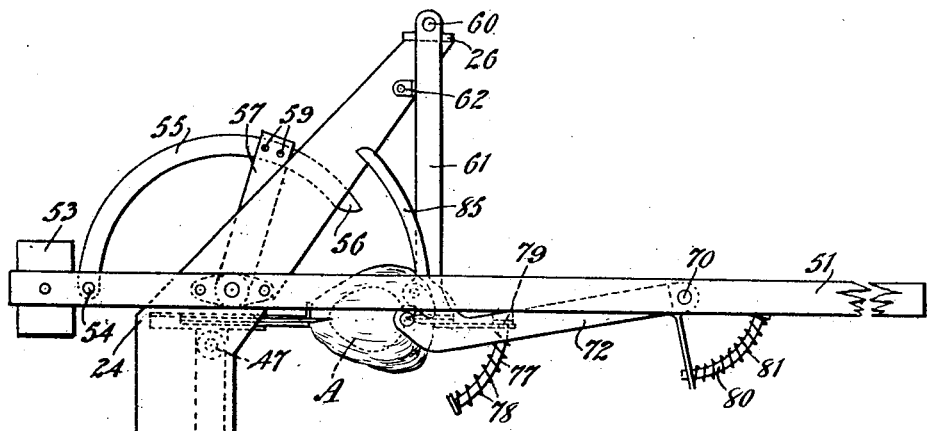
*Fig. 2,*
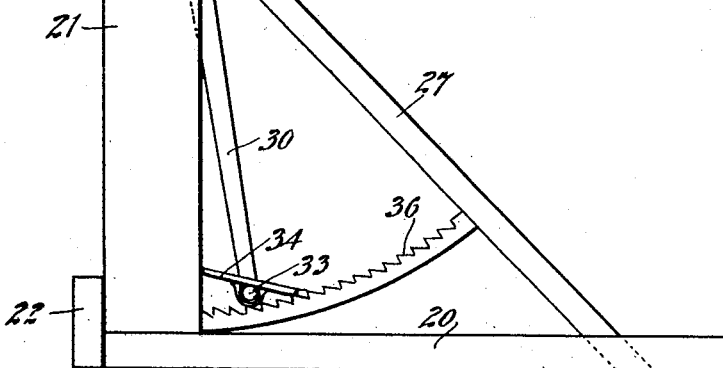
*Fig. 6,*
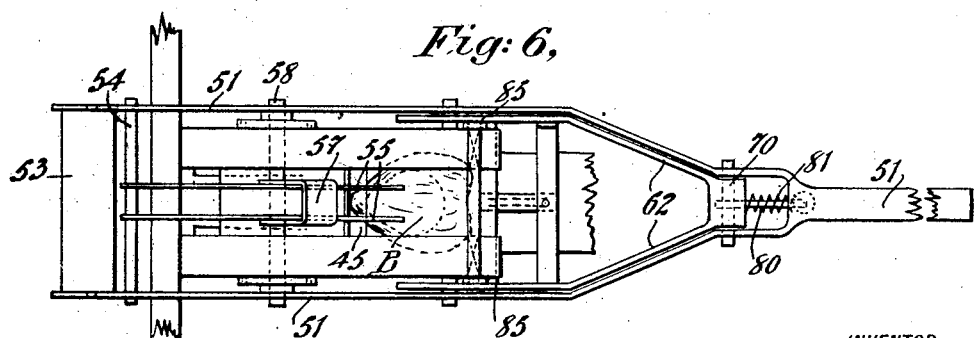
WITNESSES
INVENTOR
Felipe N. Fons,
BY
ATTORNEYS

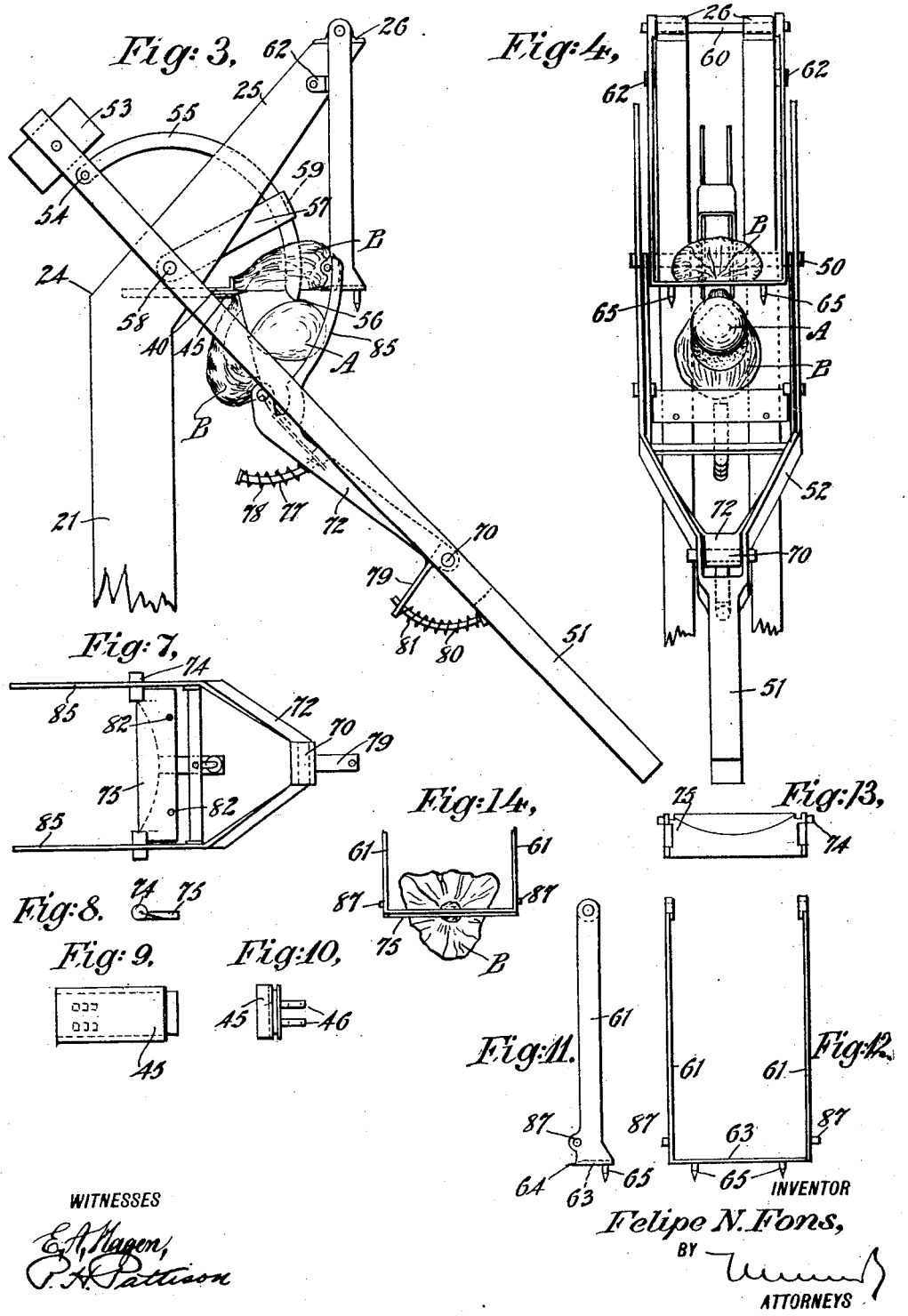

UNITED STATES PATENT OFFICE.

FELIPE NERI FONS, OF C. DEL CARMEN, E. DE CAMP, MEXICO.

COCOANUT-HUSKER.

1,367,809.   Specification of Letters Patent.   Patented Feb. 8, 1921.

Application filed October 29, 1919. Serial No. 334,112.

*To all whom it may concern:*

Be it known that I, FELIPE N. FONS, a citizen of the Republic of Mexico, and a resident of C. del Carmen, E. de Camp, Mexico, have invented a new and Improved Cocoanut-Husker, of which the following is a full, clear, and exact description.

The present invention relates to new and useful improvements in machines for removing the husk of cocoanuts, and it pertains more particularly to a manually operated device of this character.

The primary object of the invention is to provide means by which the husk of cocoanut may be severed by means of a manual operation.

A further object of the invention is to provide means for removing the nut from the husk after the latter has been severed.

A further object of the invention is to provide means for automatically removing the husk from the machine.

A still further object of the invention is to provide means by which the husk is both severed and separated to facilitate the removal of the nut.

A still further object of the invention is to provide adjustable severing means thus adapting the machine for use with nuts of various sizes.

With the above and other objects in view, reference is had to the accompanying drawings, in which:

Fig. 2 is a similar view of the machine after the first step in the operation has been completed.

Fig. 3 is a detail elevation of the upper portion of the machine showing the manner in which the husk is spread and the nut removed.

Fig. 4 is a front elevation of the machine with the parts in the position shown in Fig. 3.

Fig. 6 is a view similar to Fig. 5 with the operating handle and its associated parts in the position illustrated in Fig. 2.

Fig. 7 is a detail top plan view of one of the knives and its supporting frame.

Fig. 8 is an end view of the knife *per se*.

Fig. 9 is a top plan view of another of the knives used for severing the husk.

Fig. 10 is a view of said knife taken at right angles to Fig. 9.

Figs. 11, 12, 13 and 14 are detail views of a third knife used for severing the husk of the nut.

Referring more particularly to the drawings, the machine comprises a base 20 and projecting vertically from the forward end of said base 20, are two standards 21. These standards are arranged in spaced relation to each other and are secured to said base by means of a transversely extending brace 22.

Figure 1:
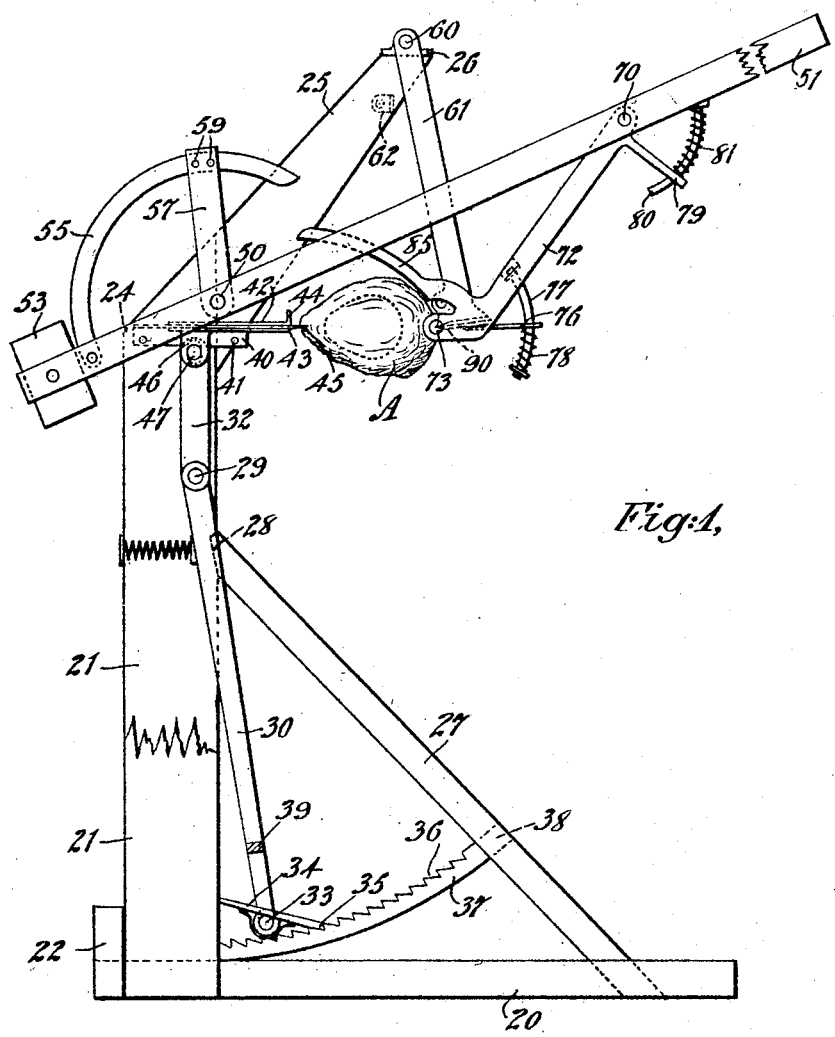
Figure 1 is a side elevation of the machine, a portion thereof being broken away showing the nut and its husk in position in the machine before the first step of the operation has taken place.
Figure 5:
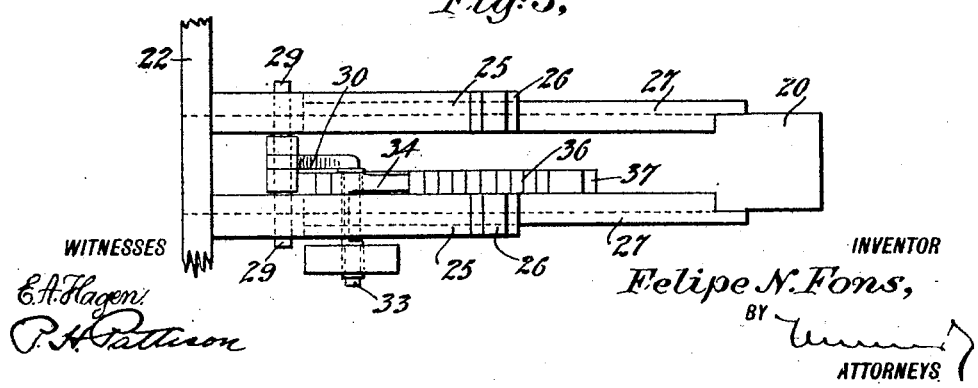
Fig. 5 is a top plan view of the machine with the parts shown in the position illustrated in Fig. 2, the operating handle and its associated parts being removed.

As best shown in Figs. 1, 2 and 3, the upper end of each of these standards is off set at 24 to provide angularly disposed upper ends 25. Secured to the extremities of the off set ends 25 are bearings 26 the purpose of which will be hereinafter more fully described. In addition to the transversely extending brace 22 angularly disposed braces 27 are secured at their lower ends to base 20, and at their upper ends to the vertical standard 21 as indicated by the reference character 28.

Bridging the vertical standards 21 near the off set portion 24 thereof, is a shaft 29 and pivotally mounted on said shaft 29 is a yoke 30, which comprises a substantially U-shaped member, the upper end of each leg of which is slightly off set as indicated by the reference character 32.

Pivotally mounted on the lower transverse member 33 of the U-shaped member 30, is a foot pedal 34, and said foot pedal 34 has its rear end formed with a pawl 35 which in turn is adapted to co-act with the teeth 36 of an arcuate rack 37. This arcuate rack 37 is secured as at 38 to one of the angular braces 27 at one end, and at its other end said rack is secured to one of the vertical standards 21. The reference character 39 designates a transversely extending brace connecting the legs of the U-shaped member 30 for the purpose of lending strength thereto.

Carried by the inner face of each of the vertical standards 21 and located at the off set portion thereof, are two horizontal guides 40, each of which is secured to its respective standard 21 by means of the bolts or the like 41. Each of these horizontal guides comprises a channel member which is formed with an upper wall 42 and a lower wall 43. The upper wall 42 is provided with a right angular portion 44, the purpose of which will be hereinafter more fully described.

Slidingly mounted in the horizontal guides 40, is a knife 45 and said knife is provided at its rear edge with depending lugs 46 to which the off set portion 32 of the lever 30 is pivotally attached as indicated by the reference character 47. By this construction it will be apparent that as the lever 30 is moved about its pivot point 29, the knife 45 will be moved longitudinally of the horizontal guides 40 for the purpose of adjusting said knife relative to the guides. It will also be noted that the knife is retained in its adjusted position by means of the engaging of the end 35 of the foot pedal 34 with the teeth 36 of the rack 37.

Pivotally secured by the off set ends 25 of the vertical standards 21 by means of a shaft 50, is an operating lever 51. This operating lever 51 comprises a handle member, the side portion of which is formed with a yoke 52, the legs of which form the means for pivotally mounting said lever. The legs of the yoke 52 are extended beyond the pivot point 50 and are provided with suitable counter weights 53 by means of which the operating lever 51 is returned to its normal position after each operation thereof. Secured as at 54 to the yoke 52 of the operating lever 51, are two piercing elements 55 which are in the form of forwardly extending arcuate members provided on their free end with a piercing point 56. For aiding in the support of these piercing members 55, brackets 57 are employed and said brackets are secured as at 58 to their respective leg of the yoke 52, the opposite end being secured to its respective piercing element as indicated by the reference character 59.

As heretofore mentioned, the reference character 26 designates a bearing and pivotally mounted in said bearing is a shaft 60. This shaft 60 forms a means for pivotally supporting a pair of links 61 which extend downwardly therefrom and to limit the movement of said links in one direction stops 62 are secured to the off set ends 25 of the vertical standards 21.

The specific construction of these links 61 is better shown in Figs. 11, 12 and 13, and by reference to said figures, it will be seen that said links have their lower ends connected by means of a transversely extending member 63, the forward edge 64 of which is beveled to form a cutting element. Projecting from the lower face of the cutting element 63, are pins 65, the purpose of which will be more fully hereinafter described.

Pivotally secured as at 70 to the operating handle 51, and projecting downwardly and forwardly therefrom, is a yoke 72. This yoke 72 is provided at the forward end of each of its legs with a circular opening 73, and pivotally mounted in said circular opening 73 as by means of the circular lugs 74, is a knife 75. This knife 75 has a rearwardly projecting member 76 which is perforated to receive a guide 77, and imposed between said members 76 and the free end of the guide 77 is a coil spring 78, the other end of said guide being rigidly secured as at 79 to the yoke 72.

Projecting rearwardly and downwardly from the yoke 72 adjacent its pivotal points 70, is a rigid arm 79, and said rigid arm 79 is perforated to receive an arcuate guide 80. Surrounding the arcuate guide 80, and interposed between the arms 79 and the underface of the operating lever 51, is a coil spring 81. By means of the last two mentioned constructions, i. e., the guide and spring 77 and 78, and the guide and spring 80 and 81, it will be seen that the knife 75 and the yoke 72 are resiliently mounted, the knife being resiliently mounted with respect to the yoke 72, and the yoke 72 being resiliently mounted with respect to the operating lever 51.

As heretofore stated, the knife 75 is pivotally mounted as at 73, and by referring to Fig. 7, it will be seen that said knife is provided near one of its edges with a plurality of circular openings 82. These openings 82 are adapted to receive the projections 65 of the knife 63 during a certain portion of the operation of the machine in a manner to be hereinafter described.

Preferably formed integral with each of the legs of the yoke 72 at their lower ends, is an upwardly and forwardly projected member 85, and each of said members 85 is provided on its under edge with a curved wall 86. Carried by each of the links 61 on their outer face, are lugs 87 and said lugs 87 are adapted to be received beneath the curved wall 86 of said forwardly projecting curved members 85, during one step of the operation of the machine.

The operation of the machine is as follows: The cocoanut within the husk is represented by the reference character A, the husk being designated by the reference character B.

By referring to Fig. 1, the position of the cocoanut and its husk will be readily ascertained. In placing the cocoanut in this position, it is grasped by the left hand in such a manner that one of its keels is positioned downwardly, the other two keels being positioned upwardly as best shown in Fig. 14, it being understood that a cocoanut is substantially triangular in cross sectional form when in the husk and that the corners are known as keels After the cocoanut in its husk has been so positioned, the operator engages the foot pedal 34 and moves the yoke 30 about its pivotal point 29. which action forces the knife 45 forwardly into engagement with the small hard end of the cocoanut husk.

By reason of engagement of the projections 65 with the openings 82, in the knife 75, it will be apparent that the knife 63 and the knife 75 will form a single cutting edge as best shown at 90 in Fig. 1. If now the operating lever 51 be pulled downwardly, it will be seen that the single cutting edge formed by the two knives 63 and 75 will be forced into the husk B at the larger end thereof, it being understood that the cocoanut is held in position by the two knives and by means of upwardly and forwardly curved projecting members 85.

As the operating lever 51 is further depressed, the knives 45 and 90 are forced into the husk as shown in Fig. 2. Upon further depression of the operating lever 51, the two knives 63 and 75 which form the cutting edge 90, are separated causing a splitting of the husk along the sides in parallelism with the end cuts therein which operation is best shown in Fig. 3. In this operation the knife 63 serves to support the upper half of the husk B, the knife 75 serving to force the lower half of the husk away from the upper half and this knife likewise performs the splitting operation.

As the operating lever 51 is still further depressed, the piercing points 56 of the piercing elements 55 pass through the upper half of the husk and force the cocoanut A therefrom. the operation being likewise shown in Fig. 3.

As the cocoanut is forced loose from the upper half of the husk, it is grasped and removed from the machine, after which the pressure on the operating lever 51 is removed and under the influence of the counter weight 53, the operating lever 51 returns to its normal position shown in Fig. 1, which position automatically throws the cocoanut husk B from the machine and leaves the parts in their normal position, ready to start another cycle of operation.

From the foregoing, it will be seen that the present invention provides means for effectively removing the husk of a cocoanut without subjecting the cocoanut *per se* to injury, and at the same time provides a machine in which the above described operation is efficiently and expeditiously carried out.

Having thus described the invention, what is claimed is:

1. A machine for husking fruit comprising a support, a plurality of husk cutting elements for supporting the fruit operated upon, and means for operating said husk cutting elements, said husk cutting elements serving subsequently upon operation of their operating means to remove a portion of the cut husk.

2. A machine for removing the husks of cocoanuts comprising in combination with a suitable support, a plurality of oppositely disposed cutting elements adapted for engagement with opposite sides of the cocoanut to support the same in operative position and subsequently operating to split the cocoanut husk, and separate means for removing the cocoanut from the split husk.

3. A machine for removing the husks of cocoanuts, comprising in combination, a suitable supporting means, a plurality of cutting elements adapted to cut the husk of the cocoanut, means for swinging one of said cutting elements relative to the remaining cutting elements to split the husk of the cocoanut, and means for removing the cocoanut from the split husk substantially as described.

4. A machine for removing the husks of cocoanuts, and similar fruit, comprising, a suitable support, a plurality of cutting elements adjustably carried by said support and adapted to support the cocoanut and its husk in operating position, means for adjusting said cutting elements, means for moving one of said cutting elements relative to the remaining cutting elements for splitting the cocoanut husk, and means for removing the cocoanut from the husk after the latter has been split.

5. A machine for husking cocoanuts, comprising a suitable support, an operating lever pivotally carried by said support, cutting elements pivotally carried by said support, a movable cutting element carried by said operating lever, and means for operating said cutting elements to first cut the husk by spreading said cutting elements and subsequently split the husk substantially as described.

6. A machine for husking cocoanuts and similar fruit, comprising a suitable support, a plurality of knives carried by said support, and adjustable relative thereto, an operating lever pivotally carried by said support, a knife carried by said operating lever, and co-acting with the first mentioned knives to cut and split the cocoanut husk, and means carried by said operating lever for removing the cocoanut from the split husk substantially as described.

7. A machine for removing cocoanuts from their husks comprising a suitable support, a plurality of knives carried by said support, and adjustable relatively thereto, means pivotally carried by said support for operating one of said knives, a separate knife carried by said pivoted knife operating means and coacting with the first-mentioned knife to cut and split the cocoanut husk, and means carried by said pivoted knife operating means to remove the cocoanut from the split husk.

8. In a machine of the character described, a husk cutting and splitting mechanism, and husk piercing means for removing the cocoanut from the husk subsequent to the cutting and splitting operation.

9. In a machine of the character described, a suitable husk cutting and splitting mechanism, means for operating said husk cutting and husk piercing splitting mechanism, and means for removing the fruit from the split husk, said fruit removing means being automatically operated subsequent to the operation of the cutting and splitting mechanism.

10. In a cocoanut husking machine, means for supporting and halving the cocoanut husk, means for subsequently removing one of the halves of said husk, and means for subsequently removing the cocoanut from the remaining half of said husk.

11. In a cocoanut husking machine, means for supporting and splitting the cocoanut husk, means for subsequently removing a portion of said split husk from the cocoanut, and means to act on said cocoanut to remove it from the remaining split husk.

12. In a cocoanut husking machine, means for supporting and splitting the cocoanut husk, means for removing a portion of said split husk from the cocoanut and means for piercing the remaining husk to remove the cocoanut therefrom and discharge the same from the machine.

13. In a cocoanut husking machine, means for supporting and cutting the cocoanut husk, means for splitting said cocoanut husk, means for removing a portion of the split husk from the cocoanut and the remaining split husk, and means adapted to pierce the last mentioned portion of said split husk to simultaneously remove the cocoanut therefrom and discharge it from the machine.

14. In a cocoanut husking machine, a stationary knife, a sliding knife, a pivoted knife, and means for simultaneously moving the sliding knife and pivoted knife into engagement with the husk operated upon and move said husk in the direction of the stationary knife to affect a splitting of the said husk.

15. In a cocoanut husking machine, a plurality of husk splitting elements for supporting the cocoanut and its husk with its longitudinal axis in a horizontal plane, means for removing the lower portion of said husk, and means for subsequently removing the cocoanut from the upper portion of said husk and simultaneously discharge the cocoanut from said machine.

16. In a cocoanut husking machine, a plurality of husk splitting elements for supporting the cocoanut and its husk in operative position, means for removing the lower portion of said husk, and means for subsequently removing the cocoanut from the remaining portion of the husk.

17. A cocoanut husking machine comprising means for supporting the unhusked cocoanut, means for removing a section of the husk from the cocoanut, and means for forcing the cocoanut out of the remaining portion of the husk.

18. In a cocoanut husking machine, a plurality of independently movable knives adapted to support the unhusked cocoanut, means for operating said knives to split the cocoanut husk and remove a portion thereof, and means carried by one of the knife-operating means for removing the cocoanut from the remaining portion of its husk.

19. A cocoanut husking machine comprising a plurality of independently operated knives for supporting the unhusked cocoanut in operative position, means for operating said knives to split the husk and remove a portion thereof, and means for removing the cocoanut from the remaining portion of said husk.

20. A cocoanut husking machine comprising a plurality of independent knives for supporting the unhusked cocoanut in operative position, separate means for moving each of said knives toward and away from each other to split the husk, and remove a portion thereof from the cocoanut, and means for disengaging the remaining portion of the husk from the cocoanut.

21. A cocoanut husking machine comprising a plurality of oppositely disposed knives adapted to support the unhusked cocoanut in operative position, separate means for moving said knives independently toward each other to split the cocanut husk, means for moving one of said knives relatively to the other for removing the split portion of the husk, and means for subsequently removing the cocanut from the remaining portion of the husk.

22. A cocoanut husking machine comprising a plurality of opposed knives for supporting the unhusked cocoanut in operative position, means for moving said knives in opposite directions to engage the cocoanut to split the husk, means for swinging one of said knives relatively to the other for removing a portion of the split husk, and means for removing the cocoanut from the remaining portion of the husk, said last-mentioned means depending upon the swinging movement of the swinging knife for its operation.

23. A cocoanut husking machine comprising opposed knives adapted to support the cocoanut in operative position, means for operating said knives independently of each other for supporting the cocoanut husk, means for swinging one of said knives relatively to the other to remove a portion of the cocoanut husk, and operating means carried by the swinging knife for removing the cocoanut from the remaining portion of the husk.

24. A cocoanut husking machine comprising in combination with a support, a knife reciprocatively mounted on said support, a lever pivotally mounted on said support, a second lever pivotally mounted on the first-mentioned lever and movable therewith, a knife carried by said second-mentioned lever and opposed with respect to the first-mentioned knife whereby supporting means for an unhusked cocoanut is provided, means for causing a splitting operation of the cocoanut husk upon initial movement of the first-mentioned lever and removing a portion of the split husk upon subsequent movement of said lever, and means for removing the cocoanut from the remaining portion of the split husk upon the final movement of said first-mentioned pivoted lever.

25. In a cocoanut husking machine, a suitable support, a bracket pivotally mounted in the top of said support, a lever pivotally mounted between the ends of said support, a knife slidably mounted in said support, means for operating said knife, a supporting ledge carried by the lower end of said bracket, and a knife carried by said pivoted lever and so mounted thereon as to enter the cocoanut husk upon initial movement of the pivoted lever to split the husk, remove a portion of the split husk upon further operation of the pivoted lever, and remove the cocoanut from the remaining portion of the split husk upon final operation of said lever.

26. In a cocoanut husking machine, a support, a reciprocating knife carried by said support, a pivoted lever, a reciprocating knife carried by said pivoted lever, and adapted to swing therewith, means carried by said pivoted lever for reciprocating said knife to split the cocoanut husk and remove a portion thereof, and separate means carried by said lever for piercing the remaining portion of the cocoanut husk to remove the cocoanut therefrom.

27. In a cocoanut husking machine, a plurality of opposed reciprocating knives for supporting the unhusked cocoanut in operative position, means for reciprocating one of said knives to support the husk of the cocoanut, means for swinging said reciprocating knife to remove a portion of the split husk, and means for automatically removing the cocoanut from the remaining portion of the husk upon operation of the knife swinging means.

FELIPE NERI FONS.